United States Patent [19]

Herloski et al.

[11] Patent Number: 4,863,251
[45] Date of Patent: Sep. 5, 1989

[54] DOUBLE GAUSS LENS FOR A RASTER INPUT SCANNER

[75] Inventors: Robert P. Herloski, Rochester; Ned J. Seachman, Penfield; Edgar E. Price, Webster, all of N.Y.

[73] Assignee: Xerox Corporation, Stamford, Conn.

[21] Appl. No.: 25,755

[22] Filed: Mar. 13, 1987

[51] Int. Cl.⁴ .............................................. G02B 11/26
[52] U.S. Cl. ...................................................... 350/471
[58] Field of Search ........................................ 350/471

[56] References Cited

U.S. PATENT DOCUMENTS

| | | | |
|---|---|---|---|
| 3,489,488 | 1/1970 | Hoogland | 350/222 |
| 3,508,812 | 4/1970 | Carlough, Jr. | 350/221 |
| 4,123,144 | 10/1978 | Mandler et al. | 350/222 |
| 4,318,135 | 3/1982 | Allis et al. | 358/294 |
| 4,367,493 | 1/1983 | Matteson | 358/293 |
| 4,377,326 | 3/1983 | Kobayashi | 350/471 |
| 4,385,325 | 5/1983 | Chen | 358/294 |

FOREIGN PATENT DOCUMENTS 0061813  4/1984  Japan ................................. 350/471

Primary Examiner—Bruce Y. Arnold
Assistant Examiner—Rebecca D. Gass

[57] ABSTRACT

A double Gauss reduction lens is optimized for projecting line images from an object plane onto a photosensor array. The six elements, four-component lens has a numeral focal length of 550 mm, a field of view of 17° at the numeral 550 mm overall object to image conjugate length and a magnification of 0.1102. The lens is characterized by a high modulation transfer feqency, large depth of focus and low distortion.

1 Claim, 3 Drawing Sheets

DOUBLE GAUSS LENS FOR A RASTER INPUT SCANNER

FIGS. 3a and 3b are modulation transfer function curves for the lens of FIG. 2 through frequency and focus, respectively.

| | | LENS SURFACE DATA TABLE | | | |
|---|---|---|---|---|---|
| SURFACE | RADIUS (mm) | THICKNESS (mm) | GLASS | REFRACTIVE INDEX, Nd | Abbe No. Vd |
| 1 | 29.8630 | 2.6700 | LAC8 HOYA | 1.713 | 53.94 |
| 2 | 75.6383 | 0.7584 | AIR | | |
| 3 | 11.7560 | 2.6800 | LAC9 HOYA | 1.691 | 54.70 |
| 4 | 20.8345 | 1.7100 | FD15 HOYA | 1.69895 | 30.05 |
| 5 | 9.5827 | 5.1627 | AIR | | |
| 6 | ∞ | 8.8292 | AIR | ASTOP | |
| 7 | −11.0582 | 1.3100 | FEL4 HOYA | 1.56138 | 45.23 |
| 8 | 99.1725 | 3.9641 | BACD5 HOYA | 1.58913 | 61.25 |
| 9 | −16.0504 | 0.2547 | AIR | | |
| 10 | −229.5088 | 2.4985 | LACL5 HOYA | 1.69350 | 50.76 |
| 11 | −31.7189 | 33.5779 | AIR | | |

Note:
Positive Radius indicates the center of curvature is to the right.
Negative Radius indicates the center of curvature is to the left.
Thickness is axial distance to the next surface.

The invention relates to raster input scanners and electronic reprographic copiers, and more particularly, to a double Gauss reduction lens for imaging a line from a scanned document onto a photosensitive diode array.

Raster input scanners incorporate devices such as a linear array of photo-optical elements for scanning a document image scan line by scan line. Typically, a platen-like surface is provided on which the document to be scanned is supported. Some representative prior art image scanners are disclosed in U.S. Pat. Nos. 4,385,325, 4,367,493, and 4,318,135. The lens used for a particular system should provide line images at a photosensor array characterized by low distortion, large depth of focus and good modulation transfer function. The present invention is directed to a four element, double Gauss reduction lens which is particularly suited to provide optical performance in image input scanners.

Double Gauss lenses are known in the art. U.S. Pat. No. 4,377,326 discloses a macrolens system comprising four components with a total of six lens elements. The lens is designed to operate in a magnification range of 1.7 to 8X. U.S. Pat. Nos. 3,489,488, 3,508,812 and 4,123,144 disclose a four-component six-element lens.

These prior art lenses are not optimized for line scanning and imaging function and the design of the present lens is believed distinguishable over these references.

More particularly, the present invention is directed to a double Gauss reduction lens for imaging a line object at an object plane onto a photosensitive image plane, said lens comprising a pair of doublet meniscus elements concave toward, and defining a central aperture therebetween, and a pair of singlet positive meniscus elements, said singlet elements having an outer surface generally concave towards said central aperture, wherein said lens consists essentially of the following design parameters:

focal length f=50 mm
field angle ±17°
total conjugate 550 mm

IN THE DRAWINGS

Figure 1:
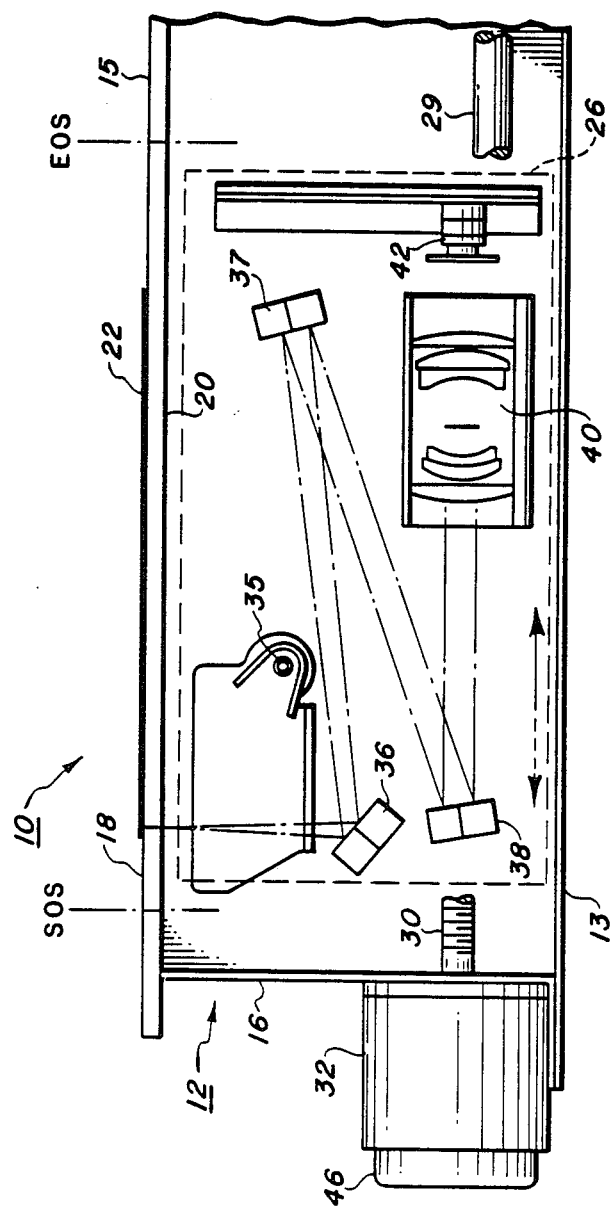
FIG. 1 is a schematic view of a raster input scanner utilizing the double-Gauss reduction lens of the present invention.

Referring to FIG. 1, there is shown an exemplary raster input scanner designated generally by the numeral 10 incorporating the double-Gauss reduction lens of the present invention. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocal movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A lamp 35 provides an incremental line of illumination at the platen. The lens image is reflected from mirrors 36, 37, 38 and is focused by double Gauss reduction lens 40 onto scanning array 42. Array 42, which may be a charge coupled device (CCD) sensor array is suitably mounted on carriage 26 in predetermined operative relation with platen 20 so as to scan the document placed thereon. Lens 40, described in detail below, focuses onto array 42 a line-like area extending across the width of platen 20 and perpendicular to the direction of movement of carriage 26. The document is therefore scanned from start-of-scan (SOS) to end-of-scan (EOS) position.

Scanner 10 is adapted to be coupled, either directly or through a communication channel with a local or remote output, for example, a publishing workstation, personal computer, printer, or the like. Further details on the operation of input scanner 10 are provided in copending application Ser. No. (D/86226) whose contents are hereby incorporated by reference.

Figure 2:
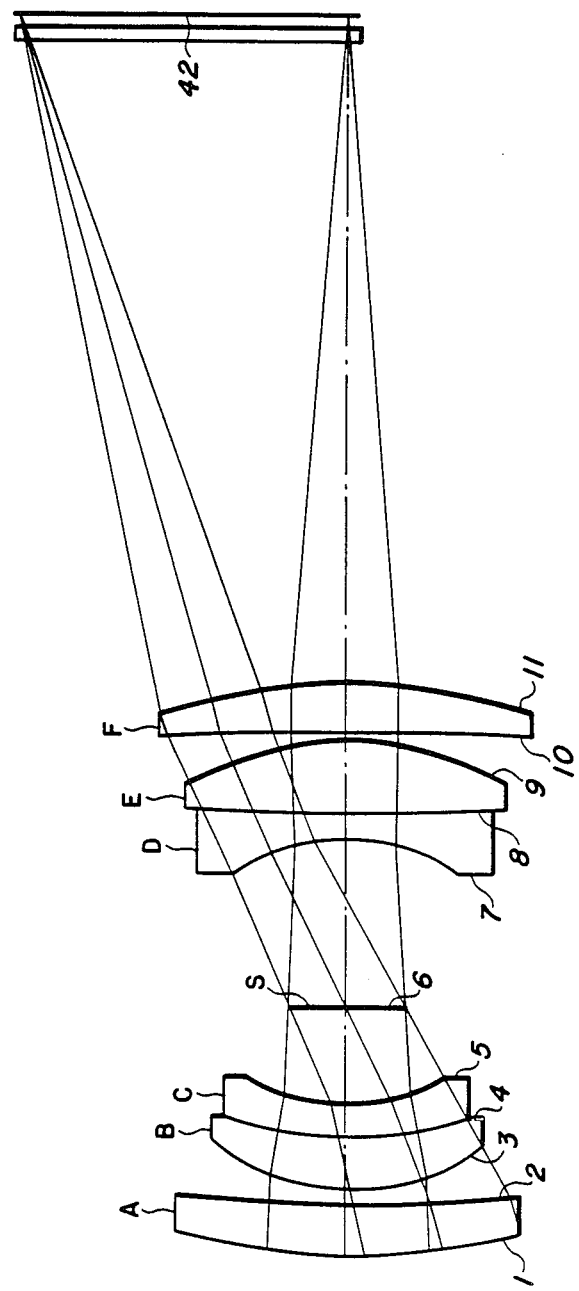
FIG. 2 shows a schematic cross-sectional view of the reduction lens of the present invention.
Figure 3A:
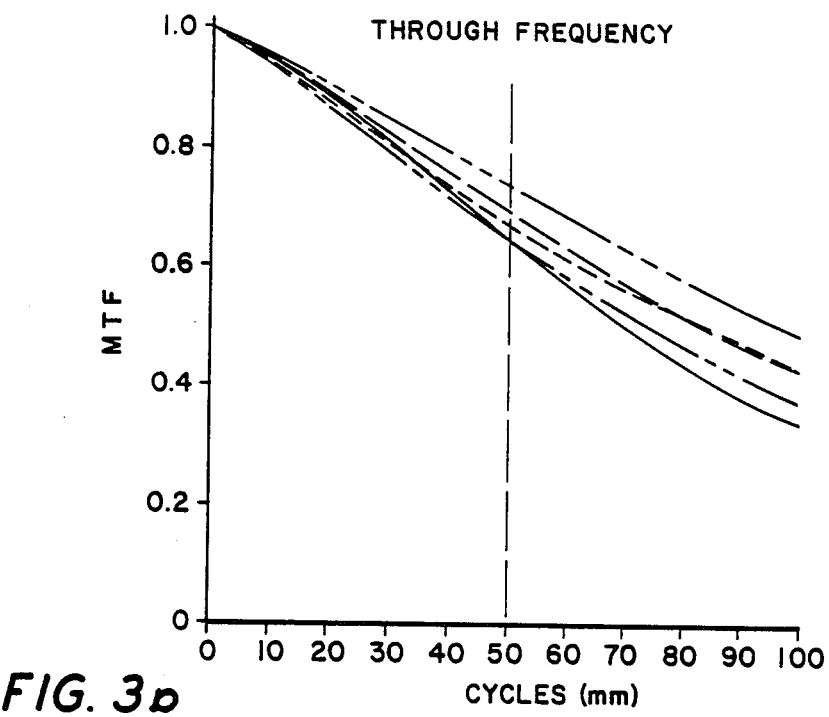
Figure 3B:
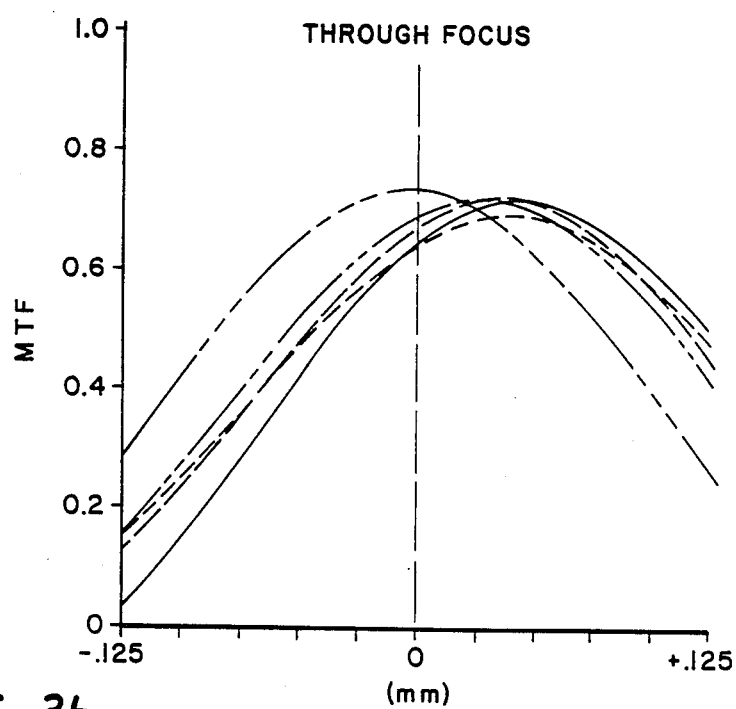

Referring to FIGS. 2, 3a and 3b and the Lens Surface Data Table, there is shown a diagram or table, respectively, of constructional data of the preferred embodiment of the lens 40 employed in an input scan system of approximately 550 mm overall object-to-image conjugate length. The lens is designed for operation over a field angle of ±17° and at a magnification of 0.1102. It has a nominal focal length of 50 mm and an infinite f/number of f/5.6. The lens is distinguished by a high MTF (67% peak at 5.5 cycles/mm in object space), large depth of focus (>0.12 mm for 50% MTF at 50 cycles/mm in image space) and low distortion (<0.05%). This extremely good performance is achieved with six individual elements including two singlets and two doublets. Singlet lens A is a generally positive meniscus lens which is concave towards the aperture stops; singlet lens F is a generally positive meniscus lens which is generally concave facing the aperture stop. The central four lenses are two doublets (BC) and (DE) on opposite sides of the central aperture. Doublet BC comprises two generally meniscus lens elements, both concave towards the aperture S. Doublet DE also comprises two generally meniscus lens elements cemented together and generally concave towards aperture S.

FIG. 3a is a modulation transfer function curve for lens 40 through frequency at the nominal 50 mm focal length. The abscissa is the spatial frequency in cycles per millimeter referenced to the image plane and the ordinate is the modulation which is unitless.

FIG. 3b is a modulation transfer function curve for lens 40 through focus at an image plane frequency of 50 cycles/mm. For this case the abscissa is a focus deviation expressed in millimeters.

The traces in FIGS. 2 and 3a and 3b illustrate MTF performance for sagittal and tangential ray fans at 0.0, 0.7 and 1.0 field positions. From these two figures it is apparent that the MTF measured at the image plane is greater than 50% at 50 cycles/mm over a focal range greater than 0.12 for both sagittal and tangential object targets.

While the invention has been described with reference to the structure disclosed, it is not confined to the details set forth, but is intended to cover such modifications or changes as may come within the scope of the following claims:

What is claimed is:

1. A double Gauss-type reduction lens for imaging a line object at an object plane onto a photosensitive image plane, said lens comprising a pair of doublet meniscus elements concave toward each other, and a central aperture therebetween, and a pair of singlet positive meniscus elements having an outer surface generally concave towards said central aperture, wherein said lens consists essentially of the following design parameters: focal length f=50 mm field angle ±17° total conjugate 550 mm and the following numerical data:

| SUR-FACE | RADIUS (mm) | THICK-NESS (mm) | GLASS | RE-FRAC-TIVE IN-DEX, Nd | Abbe No. Vd |
|---|---|---|---|---|---|
| 1 | 29.8630 | 2.6700 | LAC8 HOYA | 1.713 | 53.94 |
| 2 | 75.6383 | 0.7584 | AIR | | |
| 3 | 11.7560 | 2.6800 | LAC9 HOYA | 1.691 | 54.70 |
| 4 | 20.8345 | 1.7100 | FD15 HOYA | 1.69895 | 30.05 |
| 5 | 9.5827 | 5.1627 | AIR | | |
| 6 | ∞ | 8.8292 | AIR | ASTOP | |
| 7 | −11.0582 | 1.3100 | FEL4 HOYA | 1.56138 | 45.23 |
| 8 | 99.1725 | 3.9641 | BACD5 HOYA | 1.58913 | 61.25 |
| 9 | −16.0504 | 0.2547 | AIR | | |
| 10 | −229.5088 | 2.4985 | LACL5 HOYA | 1.69350 | 50.76 |
| 11 | −31.7189 | 33.5779 | AIR | | |

* * * * *